United States Patent

Yamashita

[11] Patent Number: 5,498,837
[45] Date of Patent: Mar. 12, 1996

[54] SLEEVE FOR DEVELOPING ROLL MEMBER

[75] Inventor: Keitaro Yamashita, Saitama, Japan

[73] Assignee: Hitachi Metals, Ltd., Tokyo, Japan

[21] Appl. No.: 479,842

[22] Filed: Jun. 7, 1995

Related U.S. Application Data

[63] Continuation of Ser. No. 103,960, Aug. 10, 1993, abandoned.

[30]  Foreign Application Priority Data

Aug. 13, 1992 [JP] Japan .................... 4-215812

[51] Int. Cl.$^6$ ............... G03G 15/09; B25F 5/02; F16C 13/00
[52] U.S. Cl. ................ 118/658; 355/251; 492/54
[58] Field of Search .................... 355/245, 246, 355/250, 251, 253, 259; 118/651, 656, 657, 658, 661; 492/53, 54

[56]  References Cited

U.S. PATENT DOCUMENTS

| | | | |
|---|---|---|---|
| 4,865,936 | 9/1989 | Asanae et al. | 355/251 X |
| 4,873,551 | 10/1989 | Tajima et al. | 118/657 X |
| 4,887,131 | 12/1989 | Kinoshita et al. | 355/253 |
| 4,960,070 | 10/1990 | Nishimura | 118/658 |
| 5,078,086 | 1/1992 | Kopko et al. | 118/657 |
| 5,247,317 | 9/1993 | Corver et al. | 355/245 X |
| 5,267,007 | 11/1993 | Watanabe et al. | 118/658 X |

FOREIGN PATENT DOCUMENTS

| | | |
|---|---|---|
| 61-28970 | 2/1986 | Japan . |
| 2088252 | 6/1982 | United Kingdom . |

*Primary Examiner*—A. T. Grimley
*Assistant Examiner*—Shuk Y. Lee
*Attorney, Agent, or Firm*—Sughrue, Mion, Zinn, Macpeak & Seas

[57]  ABSTRACT

The sleeve for a developing roll member according to the present invention is composed of two layers respectively made of an aluminum alloy and an austenitic stainless steel which are integrated together by plastic working, thereby having good durability without causing much increase in weight as well as in cost when compared with an aluminum alloy sleeve.

1 Claim, 1 Drawing Sheet

SLEEVE FOR DEVELOPING ROLL MEMBER

This is a continuation of application Ser. No. 08/103,960 filed Aug. 10, 1993, now abandoned.

BACKGROUND OF THE INVENTION

The present invention relates to a sleeve for a developing roll member which is utilized in a developing means for electrophotography, electrostatic recording, etc. where a magnetic developer is applied onto the surface of the sleeve and conveyed into a developing region to develop an electrostatic latent image.

A developing roll member conventionally used in electrophotography, electrostatic recording, etc. usually has a construction shown in FIG. 2. A permanent magnet member 1 may be a hollow cylindrical sintered magnet such as hard ferrite which is fixed to a shaft 2 with an adhesive. Alternatively, a permanent magnet member 1 consisting of magnetic powder and a binder resin may be molded integrally with the shaft 2 by an insertion injection molding method where the shaft 2 is placed in a cavity of a mold and then a mixture of magnetic powder and a binder resin is injected into the cavity to form the permanent magnet member 1. Incidentally, the permanent magnet member 1 has a plurality of axially extending magnetic poles (not shown) on the outer surface.

An end portion 2a of the shaft 2 penetrates a hole of a flange 3 and is rotatably supported thereby via a bearing 5a and the other end portion 2b of the shaft 2 is received in a recess of a flange 4 in a rotatable manner with a bearing 5b. The flange 4 has a projection 4a in alignment with the shaft 2. A sleeve 6 is placed around the permanent magnet member 1 and fixed to the flanges 3 and 4. The sleeve 6 is made of a non-magnetic material such as aluminum alloy, stainless steel, etc. 7 denotes a sealing member which is fitted between the shaft 2 and flange 3. The permanent magnet member 1 usually has a diameter of 15–60 mm, and a length of 200–350 mm.

With the above construction, the permanent magnet member 1 and sleeve 6 can be relatively rotated (for instance, the permanent magnet member 1 is fixed stationary and the sleeve 6 is rotated in accordance with the rotation of the flange 4) to conduct a development by forming a magnetic brush of developer containing (i) magnetic toner, or (ii) toner and magnetic carrier.

In the above developing roll member, when the sleeve 6 is made of an aluminum alloy, it can be produced at a low cost and the resulting sleeve 6 has an advantage of being light. However, it is likely to wear away, thereby resulting in poor durability. Further, although the surface of the sleeve 6 is usually subjected to a blast treatment to increase roughness, the desirable surface roughness cannot last long because of the above-mentioned poor durability of aluminum. This leads to a decrease in developer-conveying ability of the sleeve.

To solve the above problems, it has been proposed to subject the sleeve to an anodizing treatment so that the surface of the sleeve is hardened, thereby increasing wear-resistance. However, since the hardened surface layer of alumite is insulated, it turns out to be impossible to apply a bias voltage to the sleeve.

In addition, when the sleeve 6 made of an aluminum alloy is in a rotating state relative to the permanent magnet member 1, an eddy current is generated on the surface of the sleeve 6 and the amount of the eddy current increases as the rotation speed becomes greater.

Especially when the permanent magnet member 1 is rotated at such a high speed as 800–1000 rpm, the amount of eddy current generated is large enough to cause problems such as decrease of developing efficiency and increase of temperatures of developing roll components which is due to Joule heat.

On the other hand, when the sleeve 6 is made of a stainless steel, the resulting sleeve 6 has enough hardness, thereby attaining good durability. The developing roll member utilizing a stainless steel sleeve is free from the problems caused by eddy currents even when the permanent magnet member 1 is rotated at a high speed. However, since a stainless steel is twice as expensive as an aluminum alloy, and since the stainless steel is low in machinability, the total production cost of the developing roll member results in much higher than that in the case where an aluminum sleeve is utilized.

Meanwhile, more and more things such as inexpensiveness, lightness, compactness, high performance, etc. have been required to a developing roll member recently. Therefore, the conventional developing roll members utilizing the above kinds of sleeves are not thought satisfactory.

OBJECT AND SUMMARY OF THE INVENTION

Accordingly, an object of the present invention is to provide a sleeve for a developing roll member which can be produced at a low cost while achieving good durability, thereby being free from the above problems inherent in the conventional sleeve for a developing roll member.

To achieve the above object, the sleeve for a developing roll member according to the present invention is adapted to receive a hollow cylindrical permanent magnet member having, on the surface, a plurality of axially extending magnetic poles which is rotatable relative to the sleeve, and comprises an inner layer made of an aluminum alloy and an outer layer made of an austenitic stainless steel which are integrated together by plastic working.

DETAILED DESCRIPTION OF THE INVENTION

The present invention will be described in detail below.

Figure 1:
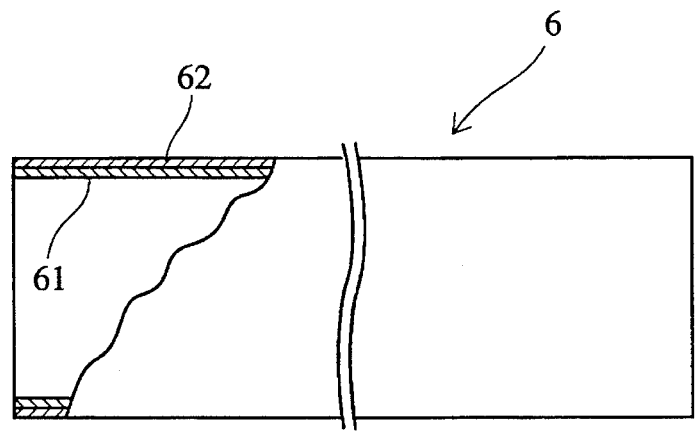
FIG. 1 is a partially cutaway, partially cross-sectional front view showing a sleeve for a developing roll member according to the present invention.
Figure 2:
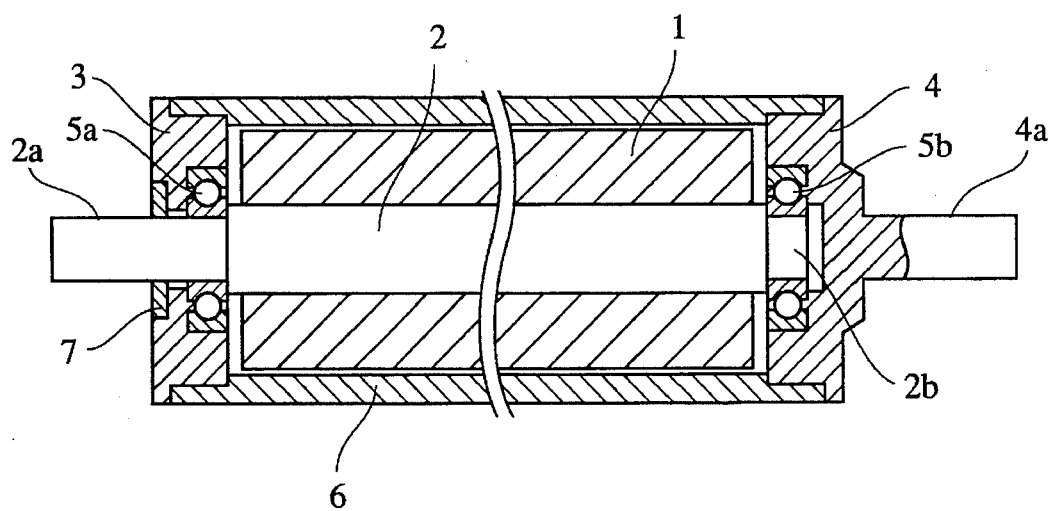
FIG. 2 is a partially cutaway, partially cross-sectional front view showing a conventional developing roll member.

Referring to FIG. 1, 6 denotes a sleeve for a developing roll member according to the present invention which has an inner layer 61 made of an aluminum alloy and an outer layer 62 made of an austenitic stainless steel.

The sleeve 6 of the present invention may preferably be produced by the following process. First, a pipe member made of an aluminum alloy and another pipe member of a little greater diameter made of an austenitic stainless steel are respectively produced. Next, the aluminum pipe is inserted into the stainless steel pipe and then the combined pipes are subjected to plastic working such as cold drawing where the combined pipes are caused to pass through a die provided with a mandrel to reduce their outer diameter, resulting in an integrated two-layer pipe.

Since the outer layer 62 of the sleeve is made of hard austenitic stainless steel, the sleeve 6 can have good wear-resistance and durability. Also, since the outer surface of the sleeve 6 is made of a stainless steel, generation of eddy current is suppressed. Further, since the inner layer 61 of the sleeve is made of light, inexpensive aluminum alloy, the sleeve 6 can be produced lighter at a lower cost when compared with a stainless steel sleeve. Due to the good thermal conductivity of aluminum alloy (for example, A 5052 has a thermal conductivity of 0.33 cal/°C·cm·sec. at 25° C., while SUS 304 has only 0.039 cal/°C·cm·sec. even at 100° C.), thermal deformation of the sleeve can be greatly reduced. Namely, (Joule) heat generated on the surface of the sleeve is released outside via connecting parts of the sleeve such as flanges, thereby preventing the sleeve from being heated to an undesirable extent.

A proportion of the inner layer 61 to the outer layer 62 in thickness is preferably 4:6 to 6:4. When the proportion is higher than 6:4, the weight and production cost of the resulting sleeve cannot be sufficiently reduced. On the other hand, when the proportion is lower than 4:6, the generation of eddy current cannot be efficiently suppressed. Incidentally, the thickness of the sleeve 6 (inner layer 61+outer layer 62) may vary depending on the size of the sleeve 6, but it is generally 0.5– 1.0 mm.

An aluminum alloy usable for the inner layer of the sleeve of the present invention may include any aluminum alloy as long as it has enough malleability for cold drawing. With respect to an austenitic stainless steel, any kind of austenitic stainless steel is applicable to the outer layer of the sleeve as long as it has good malleability for the same reason as in the case of aluminum alloy.

Incidentally, a plastic deformation rate in the cold drawing is determined depending on mechanical properties of the materials used for the layers of the sleeve.

The present invention will be explained in further detail by way of the following Examples.

EXAMPLE 1

A first pipe (outer diameter: 20.5 mm, thickness: 0.5 mm) was made of an aluminum alloy (A 6063) and a second pipe (outer diameter: 22 mm, thickness: 0.5 mm) was made of an austenitic stainless steel (SUS 304).

The first pipe was inserted into the second pipe and both ends of the combined pipes were press-fitted to prevent their relative movement. Then, the combined pipes were subjected to cold drawing by using a tool steel die having inner diameter of 20 mm and a tool steel mandrel having a diameter of 19.4 mm, so that there was obtained a integrated pipe having an outer diameter of 20 mm and a thickness of 0.7 mm. The thus-obtained pipe had an inner layer of A 6063 and an outer layer of SUS 304.

A microscopic examination was conducted on a cross-sectioned surface of the integrated pipe, and it was confirmed that the grain structure had not been destroyed during the cold drawing process and the two layers were completely integrated without containing any intervenients between them.

A developing roll member was composed by disposing a cylindrical permanent magnet member having eight symmetrically-disposed magnetic poles into the above-obtained sleeve so that the resulting developing roll member could have a magnetic flux density of 800 G on the surface of the sleeve. After fitting flanges into both ends of the sleeve, the developing roll member was subjected to a blast treatment using glass beads of #300 so that the sleeve could have a surface roughness of 1 μm (Rz). Then, magnetic toner (HMT 422 manufactured by HITACHI METALS, LTD., volume-average diameter: 10 μm) was applied to the developing roll member in a thickness of 0.4 mm, and the sleeve was rotated at 400 rpm while keeping the permanent magnet member stationary, to examine the durability of the sleeve. With respect to the surface temperature of the sleeve, the same developing roll member was rotated at 200 rpm for one hour without applying magnetic toners, and the surface temperature of the sleeve was measured after the operation. The results are shown in Table 1.

Comparative Example 1

A sleeve having an outer diameter of 20 mm and a thickness of 0.7 mm was made of SUS 304 and the tests for durability and surface temperature were repeated in the same manner as in Example 1 except for using this stainless steel sleeve instead of the sleeve according to the present invention. The results are shown in Table 1.

Comparative Example 2

A sleeve having an outer diameter of 20 mm and a thickness of 0.7 mm was made of A 6063 and the tests for durability and surface temperature were repeated in the same manner as in Example 1 except for using this aluminum sleeve instead of the sleeve according to the present invention. The results are shown in Table 1.

Incidentally, relative weight and cost of the above three sleeves are also shown in Table 1.

TABLE 1

|  | Composition | Durability[1] | Surface Temperature | Relative[2] Weight | Relative[3] Cost |
| --- | --- | --- | --- | --- | --- |
| Ex. 1 | SUS 304 + A 6063 | 160 | 12° C. | 2 | 1.8 |
| Com. Ex. 1 | SUS 304 | 160 | 8° C. | 3 | 2 |
| Com. Ex. 2 | A 6063 | 20 | 49° C. | 1 | 1 |

Note:
[1]Number of A4 sheets which could continuously be copied by the sleeve (shown in thousands).
[2]Relative weight of the aluminum sleeve is 1.
[3]Relative cost of the aluminum sleeve is 1.

As is clear from Table 1, the sleeve according to the present invention can be produced lighter at a lower cost than the stainless steel sleeve while keeping a durability equal to that of the stainless steel sleeve. Also, the heat generated in accordance with the rotation of the sleeve can be much reduced when compared with that in the case of the aluminum sleeve.

As described above in detail, the sleeve for a developing roll member according to the present invention has such a good wear resistance as the sleeve made of stainless steel does, and therefore has a satisfying durability. Due to this good wear resistance, the sleeve of the present invention can keep a sufficient surface roughness for a long time once it is provided with enough surface roughness by means of a roughening treatment, thereby maintaining an improved developer-conveying ability.

Furthermore, since the inner layer of the sleeve is made of an inexpensive, light aluminum alloy, the sleeve can be produced lighter at a lower cost when compared with that made of stainless steel. With respect to an application of bias voltage, there is no problem in electric conductivity of the sleeve, because the two layers are completely bonded together without having any intervenients therebetween.

The sleeve of the present invention is particularly effective to a high-speed development, where an amorphous silicon photosensitive drum is utilized and the sleeve itself is rotated during the developing process.

What is claimed is:

1. A sleeve for a developing roll member for use in developing an electrostatic latent image on an amorphous silicon photosensitive drum, said sleeve receiving therein a stationary hollow cylindrical permanent magnet member having on an outer surface a plurality of axially extending magnetic poles and being rotatable around said stationary hollow cylindrical permanent magnet member, said sleeve comprising an inner layer made of an aluminum alloy having enough malleability for cold drawing and an outer layer made of an austenitic stainless steel having enough malleability for cold drawing, and said inner layer and said outer layer being integrated together by cold drawing.

* * * * *